United States Patent [19]

Mineck

[11] 4,137,878
[45] Feb. 6, 1979

[54] SUPPLEMENTARY CARBURETOR

[75] Inventor: Fred Mineck, Phoenix, Ariz.

[73] Assignees: Dorothy J. Archer, Phoenix, Ariz.; Jay A. Mineck, Montclair, Calif.; Warren F. B. Lindsley, Phoenix, Ariz. ; part interest to each

[21] Appl. No.: 788,795

[22] Filed: Apr. 19, 1977

[51] Int. Cl.$^2$ ............................................. F02M 25/06
[52] U.S. Cl. ................................ 123/119 B; 123/141; 48/180 R; 123/119 D
[58] Field of Search ................... 123/141, 124, 119 B, 123/119 D; 48/180 R, 180 S, 180 M; 261/179 R

[56] References Cited

U.S. PATENT DOCUMENTS

| 2,240,459 | 4/1941 | McDowell | 123/119 B |
| 3,889,649 | 6/1975 | Polaner | 123/119 B |
| 3,930,485 | 1/1976 | Konomi | 123/141 |
| 3,990,420 | 11/1976 | Bitterman et al. | 123/119 B |
| 4,015,574 | 4/1977 | Hanff | 123/141 |

FOREIGN PATENT DOCUMENTS

| 1019861 | 11/1957 | Fed. Rep. of Germany | 123/141 |
| 2539609 | 5/1975 | Fed. Rep. of Germany | 123/141 |
| 704742 | 2/1931 | France | 123/141 |

*Primary Examiner*—Wendell E. Burns
*Attorney, Agent, or Firm*—Warren F. B. Lindsley

[57] ABSTRACT

A supplementary carburetor for crankcase emission of an internal combustion engine which aerates in a swirling manner and with the aid of air injected into the exhaust stream through venturi action, the crankcase emission combustibles.

7 Claims, 6 Drawing Figures

SUPPLEMENTARY CARBURETOR

BACKGROUND OF THE INVENTION

The purpose of the supplementary carburetor is to utilize the crankcase emissions which normally were vented out of the engine into the atmosphere. Since the P.C.V. system (Positive Crankcase Ventilation) for internal combustion engines was incorporated in the internal combustion engine, the emissions from the crankcase, consisting of blow-by gases that originate in the cylinders, pick up crankcase oil, carbon, moisture, and harmful-type emissions which are then carried directly to the intake manifold unbalancing the mixture of fuel and air which start from the gas tank through the carburetor on to the intake manifold and finally the combustion chamber. When these emissions mix with the carburetor fuel/air mixture in the intake manifold, it unbalances the ratio of fuel to air. Consequently, when the crankcase emission enters the combustion chamber and firing takes place, the heavy hydrocarbons (which are primarily combustible crankcase oil) do not burn sufficiently under normal firing conditions and consequently, form carbon in the cylinders and on the valves and spark plugs. To combat harmful emissions that become photosynthesis smog, there have been incorporated many types of emission control devices for the internal combustion engine, the latest being the catalytic converter which cuts down the oxides of nitrogen, carbon monoxide and hydrocarbons that are being expelled into the atmosphere and become smog. The incorporation of these various types of emission controls has reduced efficiency of the internal combustion engine and in many instances have caused them to use more fuel, created inferior performance of the vehicle such as rough running and hesitation on acceleration from a stop, or at various other speeds.

DESCRIPTION OF THE PRIOR ART

Attempts have been made to more effectively utilize the crankcase emission and a commercial product known as a condensator is marketed by Condensator, Inc. of Sacramento, Calif. This device, however, condenses out in a catalytic separator the heavier oil products of the crankcase emission rather than burning them to obtain their valuable fuel content. Further, in addition to the undesirable complexity of this device, the catalytic separator must be periodically cleaned such as at least every 4,000 miles.

SUMMARY OF THE INVENTION

In accordance with the invention claimed, an improved and greatly simplified supplementary carburetor is provided for the crankcase emission of an internal combustion engine.

It is, therefore, one object of this invention to provide an improved simplified carburetor for crankcase emission.

Another object of this invention is to provide a supplementary carburetor for incorporation in the P.C.V. system (Positive Crankcase Ventilation) of the modern automobiles.

A further object of this invention is to provide a new and improved supplementary carburetor for the crankcase emission of an internal combustion engine which swirls the crankcase emission and mixes the swirled mixture with air to render it combustible.

A still further object of this invention is to provide an improved supplementary carburetor for crankcase emission which utilizes venturi action to aerate said emission before transmitting it to the intake manifold of the engine.

A still further object of this invention is to provide a new and improved supplementary carburetor for crankcase emission of an internal combustion engine which is much simpler in construction than any known device.

A still further object of this invention is to provide an improved supplementary carburetor for crankcase emission having no moving parts.

A still further object of this invention is to incorporate in the design of the supplementary carburetor a venturi which insures a high speed air stream for crankcase emission creation at all engine speeds.

A still further object of this invention is to provide an improved supplementary carburetor for crankcase emissions with effective air mixing capabilities yielding more finely divided fuel droplets than heretofore possible.

Further objects and advantages of the invention will become apparent as the following description proceeds and the features of novelty which characterize this invention will be pointed out with particularly in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
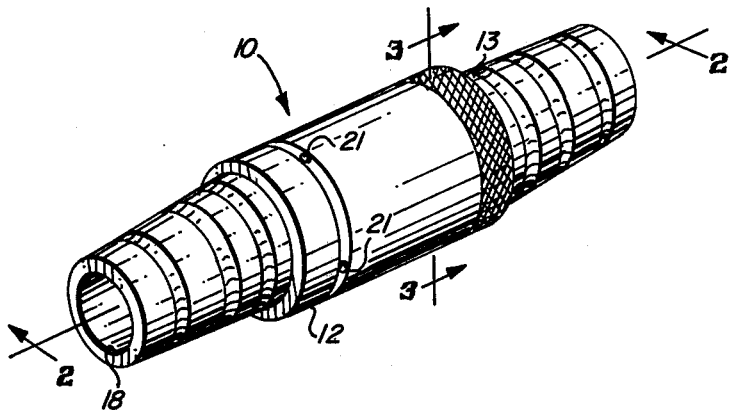
FIG. 1 is a perspective view of an improved supplementary carburetor embodying the invention.

Referring more particularly to the drawing by characters of reference, FIGS. 1, 2, 3 and 5 disclose a valve or supplementary carburetor 10 comprising an elongated tubular housing which may have a torpedo configuration formed by two telescopically fitting parts 11 and 12. Each of these parts are provided with tapered ends 13 and 14 at their non-mating ends which may be provided with ridged or grooves 15 or the like to form gas-tight seals with hose 16 forming a part of the ventilator valve hose connection 17 shown in FIG. 4.

Figure 2:
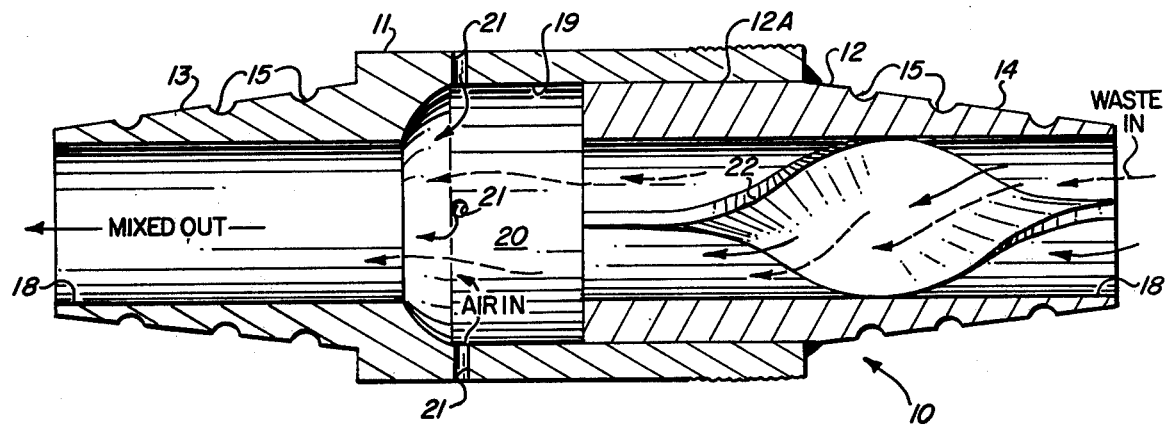
FIG. 2 is a cross-sectional view of FIG. 1 taken along the line 2—2.

As shown in FIG. 2, the telescopic mating parts 11 and 12 of the carburetor are each provided with substantially the same diameter bore 18 at their tapered nozzle ends 13 and 14 with part 11 formed to provide a larger bore 19 at its mating end for receiving therein the outer periphery of the cylindrical portion 12A of part 12. Part 12 is inserted into bore 19 of part 11 a predetermined distance such as shown in FIG. 2 providing an air and crankcase gas emission mixing chamber 20. The two parts 11 and 12 are securely fastened in this position by any suitable means, such as welding, soldering or swaging.

A plurality of apertures 21 are spacedly positioned around the periphery of part 11 of the housing for providing intake passages from the atmosphere air into chamber 20 formed by the particular telescopic connection of parts 11 and 12 of the carburetor.

Figure 3:
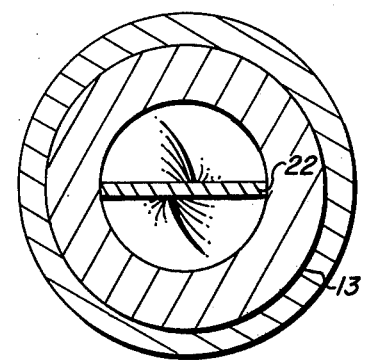
FIG. 3 is a cross-sectional view of FIG. 1 taken along the line 3—3.
Figure 5:
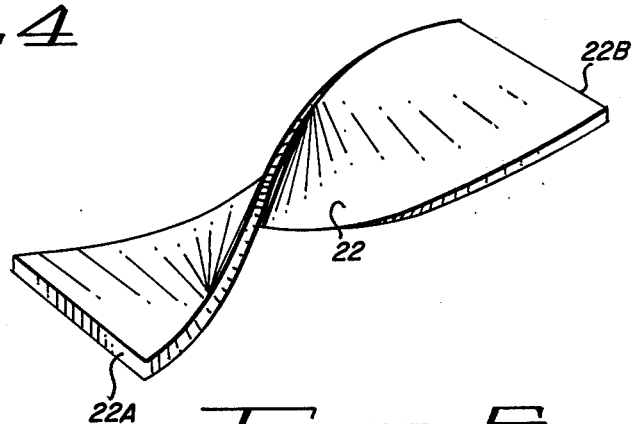
FIG. 5 is an enlarged view of the deflector plate forming a part of the supplementary carburetor

As noted from FIGS. 2, 3 and 5 of the drawing, a vane-type deflector 22 is fixedly positioned in part 12 of the carburetor such that end 22A thereof is arranged in the plane of the mating end of part 12 with part 11 thereof. The other end 22B of the deflector 22 is arranged in the plane of the tapered end of part 12 with the deflector being twisted between its end approximately 360 degrees.

As noted from the drawing, deflector 22 has a width substantially equal to the internal diameter of the bore of part 12 and may be formed of any suitable material such as metal.

Thus, crankcase emission entering bore 18 of the tapered end 14 of part 12 is directed through a path which is swirled or twisted 360 degrees before entering chamber 20 of the carburetor.

In chamber 20, the crankcase emission gases are further agitated by the injection therein under suction and venturi action air from ports or apertures 21. The swirling crankcase emission gases impinged upon by atmospheric air drawn into chamber 20 through apertures 20 cause a turbulence which aerates the crankcase oil, carbon, moisture and other harmful-type emissions so that they may be burned in the cylinders of the internal combustion engine.

Figure 4:
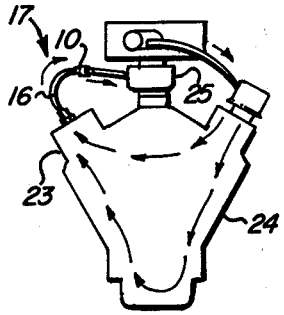
FIG. 4 is a diagrammatic view of an internal combustion engine illustrating the P.V.C. system connecting the manifold to the intake manifold of the internal combustion engine.
Figure 4A:
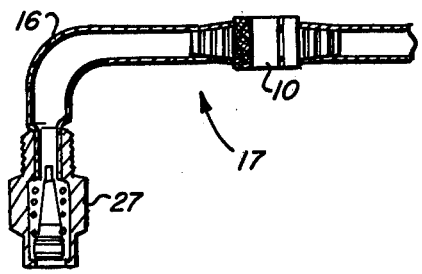
FIG. 4A is an enlarged cross-sectional view of the P.V.C. system with the supplementary carburetor shown in a suitable position in the line.

FIGS. 4 and 4A disclose the location of the disclosed supplementary carburetor in the ventilator valve hose 17 connecting the cylinder head cover 23 of the V-8 engine 24 with the intake manifold 25 of the carburetor 26. As shown in FIG. 4A, the ventilator valve hose 17 has incorporated in it the known vent valve assembly 27.

Thus, a new and improved supplementary carburetor or gaseous fumes-mixing device is disclosed which fulfills a gap in the controls for automobile pollution. In addition, the claimed device increases the mileage of present-day automobiles by utilizing more effectively crankcase emission fumes by creating a small tornado in the fumes prior to their injection in the intake manifold of the internal combustion engine, rendering them more burnable than heretofore possible. This results in smoother engine performance, easier starting conditions for warm and cold engine starts and helps control dieseling after engine operation.

Although but one embodiment of the invention has been illustrated and described, it will be apparent to those skilled in the art that various changes and modifications may be made therein without departing from the spirit of the invention or from the scope of the appended claims.

What is claimed is:

1. A mixing device for gaseous fumes comprising:
   an elongated tubular housing comprising two telescopically interconnected parts and forming a torpedoshaped configuration,
   the free end of one of said interconnected parts defining an intake port and the free end of the other of said interconnected parts defining an outlet port,
   the interconnected parts defining therebetween within said housing a gaseous fume mixing chamber,
   a plurality of openings spacedly positioned around the periphery of one of said parts forming air inlet ports interconnecting atmospheric air with the interior of said chamber,
   a deflecting vane mounted within said one of said parts for swirling the gaseous fumes received through said intake port in said first part of said housing and discharging said swirling gases into said chamber, wherein the swirling gaseous fumes are aerated by air injected into said swirling gaseous fumes prior to discharge out of said outlet port,
   said mixing chamber having a bore diameter greater than the bore of the intake and outlet ports of said parts,
   the periphery of said mixing chamber tapering into the bore of said outlet port which together with said air inlet ports forms a venturi for further aerating said swirling gaseous fumes, and
   the free ends of each of said parts being tapered to form nozzles for receiving in slip-tight fitting arrangement fume-conducting bore sections.

2. The mixing device set forth in claim 1 wherein: said deflecting vane deflects the gaseous fumes received at the intake port substantially 360 degrees before discharging it into said chamber.

3. The mixing device set forth in claim 1 wherein: said deflecting vane extends substantially the full length of said one of said parts.

4. The mixing device set forth in claim 1 wherein: said vane comprises a metallic member the width of which is substantially the diameter of the bore of said first part.

5. The mixing device set forth in claim 4 wherein: said vane is of a rigid metallic configuration.

6. The mixing device set forth in claim 1 in further combination with:
   a vent valve assembly,
   said assembly being connected at one end to the cylinder head cover of an internal combustion engine and at the other end to the intake port of the mixing device,
   said outlet port of the mixing device being connectable to the intake manifold of the internal combustion engine,
   whereby crankcase fumes of the engine are transmitted through the mixing device and aerated therein before injection into the manifold.

7. The mixing device set forth in claim 6 in further combination with:
   a first hose section for connecting said other end of said vent valve assembly to said intake port of the mixing device, and
   a second hose section for connecting said outlet port of the mixing device to the intake manifold of the engine.

* * * * *